Dec. 24, 1935.   C. J. HOLSLAG   2,025,205
ARC WELDING SYSTEM
Filed May 5, 1932
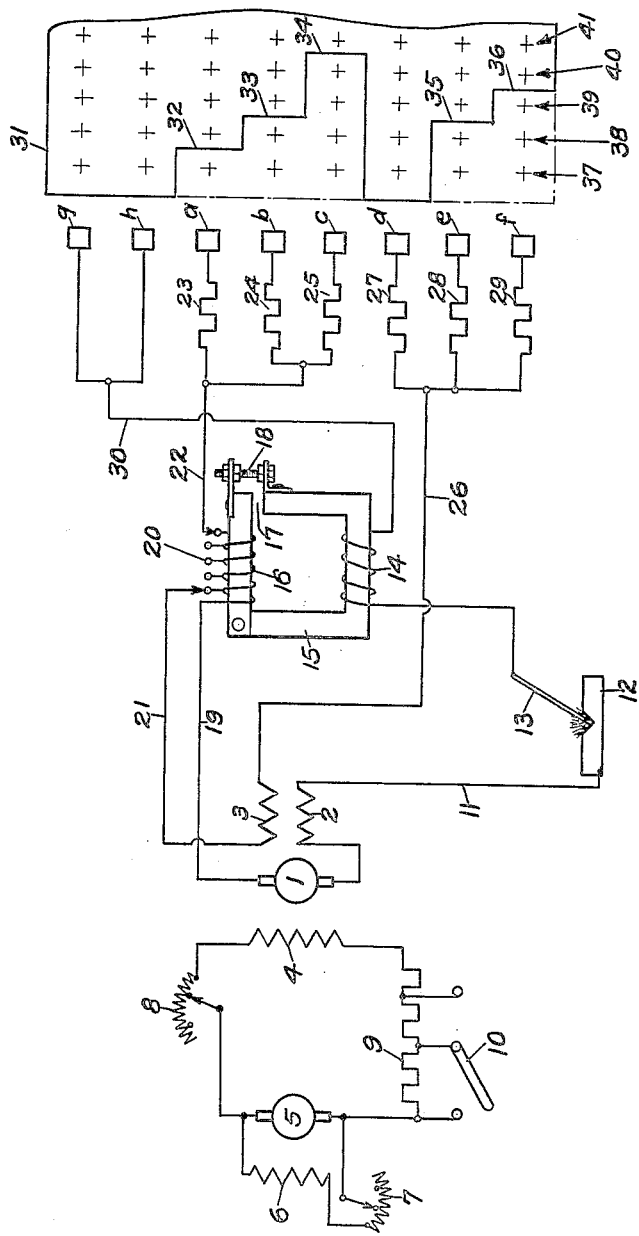
INVENTOR
CLAUDE J. HOLSLAG
BY
A. D. T. Libby
ATTORNEY Patented Dec. 24, 1935

2,025,205

UNITED STATES PATENT OFFICE 2,025,205

ARC WELDING SYSTEM

Claude J. Holslag, South Orange, N. J., assignor to Electric Arc Cutting & Welding Co., Newark, N. J.

Application May 5, 1932, Serial No. 609,375

16 Claims. (Cl. 219—8)

This invention relates to an arc welding system in which the source of current is a direct-current generator driven by any suitable source of motive power.

In order to get regulation of a direct-current arc welding generator, various arrangements have heretofore been proposed, one such being disclosed in my Patent 1,719,112, issued July 2, 1929.

Another scheme proposed has been to connect an air-core transformer with the primary in the arc circuit, and the secondary in series with the main or shunt field winding of the welding generator.

Still another scheme is the use of a similar transformer having its primary connected in the arc circuit with a few series turns on the generator which is supplied with an auxiliary field winding along with the shunt or main field winding, this auxiliary field winding being connected to the secondary of the transformer. I have found that these shunt field transformer schemes supply a dangerously high voltage to the shunt field winding which brings in an element of unsafety and necessitates heavier insulation on the main or shunt field winding, thereby causing greater expense without accomplishing the best results.

The principal object of my invention is to provide an arc welding system in which the current in the welding circuit is controlled in a new and novel manner, whereby the welding operations may be more easily and quickly performed.

Another object of my invention is to provide a welding system in which the reactions from the welding operations are controlled so as to assist the generator in its functions.

A further object of my invention is to provide a system in which the reactions from the welding circuit are controlled so that the main excitation winding of the generator is not subjected to break-downs which are ordinarily caused by high voltages induced in the generator.

These and other objects will appear to one skilled in this art from a reading of the specification taken in connection with the annexed drawing which illustrates diagrammatically my improved system.

In the drawing, 1 is a direct-current generator having an interpole field 2 and a series differential field 3 preferably arranged in the manner disclosed in my patent heretofore referred to. The generator 1 is provided with what I term a main field winding 4 which may be connected in shunt with the armature of the generator 1, but as illustrated, is connected to a small exciter generator 5 which has its shunt field 6 and control rheostat 7.

The circuit from the exciter through the winding 4 may be provided with a control rheostat 8, and also with a reactance 9 in the form of a resistance to give the control effect on the generator 1 as set forth in my Patent 1,857,306, issued May 10, 1932; that is to say, when the reactance 9 is used, the exciter 5 is designed to deliver a potential very much higher than that required to excite the field winding 4 to its normal value, and the reactance 9 is used in the manner as explained in said patent. A control switch 10 may also be utilized with the reactance 9 to cut in or out more or less of it as desired.

A main lead wire 11 from the generator 1 is connected to one of the electrodes of the welding circuit; for example, work electrode 12, while the movable electrode 13 is connected to a winding 14 on a reactor 15 which carries a second winding 16 preferably arranged on a movable part of the core of the reactor 15. Preferably the core of the reactor 15 is provided with an air-gap 17 which may be adjusted by adjusting means 18 as will be readily understood.

The winding 16 is connected to the armature of the generator 1 by the lead 19. The winding 16 is preferably provided with a plurality of taps 20, one of which is connected by a conductor 21 to one end of the series differential field winding 3; and another of the taps by the conductor 22 to one or more resistors indicated by the numerals 23, 24, and 25. The other end of the winding 3 is connected by a conductor 26 to one or more resistors 27, 28, and 29, and one end of the winding 14 on the reactor is connected by a conductor 30 to preferably a plurality of controller contact fingers, two, g and h, being shown.

Each resistor is connected to an individual contact finger a to f inclusive, and the fingers are adapted to engage a metallic member 31, which is preferably in the form of a cylindrical drum, only a part of which is diagrammatically shown, having portions cut out at 32 to 36 inclusive, whereby the contact fingers are brought into engagement with the surface of the drum, thus completing a circuit from one finger to another through the drum as the same is rotated.

Coming now to the operation and advantages of my welding system, let it be assumed that the controller is turned so that the contact fingers are turned whereby they are positioned on the controller in line with the arrow 37. In this position, the fingers g, h, and d will be in electrical contact with the drum 31, and a circuit will then be traced from the generator 1 through the interpole winding 2 and conductor 11, welding electrodes 12 and 13, winding 14 of the reactor, conductor 30, through the contact fingers g and h in multiple, through the drum and by way of finger d to the resistor 27, conductor 26, and the differential series field winding 3, and through a portion of the winding 16 through the conductor 19, back to the generator. This puts a predetermined amount of resistance in series with a part of the reactor winding, and the series differential winding on the generator.

When the drum controller 31 is moved to the position indicated by the arrow 38, it will be noted that the contact finger a is in engagement with the drum and a part of the current in the arc circuit will pass through the resistor 23, through a part of the winding 16, on the reactor, depending on what tap 20 the lead 22 has been connected. Thus a parallel circuit is completed in which part of the reactor winding 16 and resistor 23, together in series, are in parallel with the winding 3 of the generator.

In the position of the controller indicated by the arrow 39, the contact fingers b and e are brought into engagement with the drum 31, and the resistor 24 is connected in multiple with the resistor 23 and the resistor 28 in parallel with the resistor 27, the combination of the two being in series with the winding 3.

In the position of the drum controller indicated by the arrow 40, the only change is the addition of the resistor 29 in parallel with 27 and 28, while in the position indicated by the arrow 41, the resistor 25 is connected in parallel with 23 and 24.

Taking any one of the positions of the controller; for example, position 39, it will be seen that the amount of current passing through the differential winding 3 of the generator 1, assuming a definite speed for the generator, can be regulated to a desired value by reason of the resistors 27 and 28 in parallel series arrangement with the winding 3 and the parallel circuit comprising part of the reactor winding 16 connected in series with the resistors 23 and 24, further regulation being obtained by the positioning of the leads 21 and 22 with respect to the taps 20 on the winding 16 and the adjustment of the air-gap 17 by the adjusting device 18.

In the operation of a plain differential welding generator; that is, one having a main field self or separately excited, and a series field connected in differential relation thereto, together with an impedance or reactance coil in series in the arc circuit, the action is approximately as follows:

When the movable electrode is brought into contact with the work or piece to be welded, the open circuit voltage of approximately 65, now required for most welding rods, must be lowered as quickly as possible to practically zero. This means that for an instant there is a tendency for large current to flow in the welding circuit, with a consequent shock to the motor or other driving mechanism, as well as to the generator itself, particularly the commutator and brushes on which this action is severe. The effect of the impedance coil usually used is to hold back the rush of current, and this of course slows down the differential action of the series winding of the generator, so that this overrun of heavy current continues for an appreciable time, speaking in terms of arc-time-control.

When the electrodes are separated and the arc is drawn, a reverse action takes place, and an "underrun" occurs with this combination as described.

In the first instance, the quicker the overload is taken away, and in the second instance the faster the underrun is eliminated, the speedier will be the welding operations and the longer the life of the generator equipment, and it is the principal feature of my invention to hasten the unloading action and to restore the normal load action; or in other words, to shorten the time and reduce the amount of the overrun and underrun of the welding current.

I accomplish this by arranging the series differential field and the reactor windings with various adjustments therebetween as has been previously described in general.

In my arrangement as depicted in the drawing, when the electrode 13 is brought into contact with the work 12, the reaction of the winding 14 on the winding 16 is such as to reduce the reactance thereof momentarily, so as to allow more current to pass through the differential winding 3 than will normally pass through this winding by reason of its circuit which is in shunt to a part of the winding 16. This at once increases and speeds up the effect of the differential winding 3.

The result is brought about by reason of the two parallel circuits, the differential field winding 3, and the transformer or impedance coil winding 16, the latter of which has a much greater impedance due to its larger number of turns and greater cross-section of iron than the winding 3, and therefore changes of current in the welding circuit will produce greater changes in the differential field winding 3, than the usual connection of an impedance coil in series with the winding 3. This is readily understood by considering two parallel circuits of similar resistance, but of different reactance, connected into a circuit, such as a welding circuit, in which changes of current may rapidly take place. These changes of conditions will cause more current to flow through that parallel circuit having the lesser reactance, and such is the case in the welding system herein described, in which the series differential field 3 is in parallel with a part of the reactor, differing in reactance from the series field and controlled by taps as well as by resistors which may also be provided with taps.

Since the reactor is a transformer, the result is that when the movable electrode is touched to the work, more current will flow through the differential field than through the reactor circuit, and when the current is changing in the other direction; that is, from high values to low, less current will flow through the series differential field. In either case, the action is in a direction to maintain and sustain the arc which is controlled in a greatly improved manner.

In addition to getting the improved regulation and control in the manner heretofore explained, I can increase the range of adaptability of my system by connecting the series differential field coil windings of the welding generator in series, in multiple, or in series-multiple or multiple-series arrangement, as all of these arrangements can be brought into best cooperative working relationship with the arc by reason of the adjustable parallel reactor arrangement, both parallel circuits being further adjustable by reason of the controller and resistors.

The series turns of the winding 3 are few as compared with the turns on the main field winding 4, and consequently the main field winding 4 is not subjected to any voltages which would tend to break down the insulation thereon, so that no extraordinary care need be taken in insulating the wire comprising this winding. Furthermore, the inductive parallel connection around the differential winding 3 reduces the transformer effect of the winding 3 on the winding 4, which in older forms of generators act to demagnetize the generator field.

While I prefer to use a double-wound adjustable reactor as indicated, I may use an autotransformer having a single winding having suitable taps to get the right amount of reactance in the welding system.

It is to be understood that the construction of the drum controller 31 may be varied over a considerable range to accommodate a desired number and arrangement of resistors, which it should be noted are of very low resistance, brought into circuit by the controller. The number of resistors and their arrangement and value will, of course, depend on the size of generator that is to be regulated, as well as the reactor used in connection therewith.

Having thus described my invention, what I claim is:

1. An arc welding system including, a direct current generator having a main field winding with means for exciting the same, and at least a series-differential winding, a reactor and a drum controller in the arc circuit, said reactor having at least a part of its winding in parallel with said series-differential winding, said controller adapted to close the arc circuit and then to cut in resistors into each of said parallel circuits.

2. An arc welding system including, a direct current generator having at least a main field winding with a single unidirectional source of excitation therefor and a direct-acting series-differential winding, and a reactor having a plurality of windings, one of which is continuously in series in the arc circuit, said reactor having at least a part of one of its windings in parallel with said series-differential winding and having a greater impedance than the latter, and means for changing the magnetic reluctance of the core of said reactor.

3. An arc welding system including, a direct current generator having at least a main field winding, an interpole series winding and a series-differential winding, and a reactor in the arc circuit, said reactor having at least two windings at least a part of one of its windings being in parallel with said series-differential winding while the other winding is in series with the arc circuit, and means including a resistance type controller for changing said parallel relationship in acordance with the requirements of the welding operations to be performed.

4. An arc welding system including, a direct current generator having at least a main field winding with a single unidirectional source of excitation therefor and a direct-acting series-differential winding, and a reactor in the arc circuit, said reactor having spaced windings with one winding continuously in the arc circuit, while the other has at least a part of its winding in parallel with said series-differential winding, and resistors adapted to be connected in series with the first-mentioned reactor winding and also into said parallel circuits.

5. An arc welding system including, a direct current generator having at least a main field winding and a series-differential winding, and a reactor in the arc circuit, said reactor having at least a part of its winding in parallel with said series-differential winding, and resistors adapted to be connected by a common control device into said parallel circuits.

6. An arc welding system including, a direct current generator having at least a main field winding, an interpole winding and a series-differential winding, and a reactor in the arc circuit, said reactor having windings thereon disposed to produce a transformer action, one winding being connected in series with the interpole winding and in the arc circuit at least a part of another of said windings being connected in parallel with said series-differential winding, and means comprising resistors adapted to be connected in series with said first winding and also in each of said parallel circuits for modifying the operating characteristics thereof.

7. An arc welding system including, a direct current generator having at least a main field winding and a series-differential winding, and a reactor in the arc circuit, said reactor having windings thereon disposed to produce a transformer action, one winding of the reactor being permanently connected into the arc circuit when established, while at least a part of the other winding is connected in parallel with said series-differential winding.

8. An arc welding system including, a direct current generator having a main field winding, an interpole winding and at least a differential-series winding, means for quickly controlling the action of said differential-series winding comprising a reactor having a winding in parallel with said differential-series winding, and another winding in inductive relation to the first winding and connected directly into the arc circuit and in series with said interpole winding with means for adjusting the reactive effect of both the reactor and the differential-series winding.

9. An arc welding system including, a direct current generator having a main field winding with a single unidirectional source of excitation therefor, an interpole winding, and at least a direct-acting differential-series winding, means for quickly controlling the action of said differential-series winding comprising a reactor having a winding in parallel with said differential-series winding with means for adjusting the reactive effect of both the reactor and the differential-series winding, and further means comprising resistors adapted to be connected into each parallel circuit for modifying the operating characteristics thereof.

10. An arc welding system including, a direct current generator having a main field winding and at least a differential-series winding, means for quickly controlling the action of said differential-series winding comprising a reactor having windings arranged in transformer relationship, one of said windings being connected directly into the arc circuit, while another winding has at least a part of it connected in parallel with said differential-series winding.

11. An arc welding system as set forth in claim 8, further characterized in that the welding circuit is completed through a controller, and further characterized in that resistors may be cut into both of said parallel circuits, one of which includes the reactor, by said controller.

12. An arc welding system including, a direct current generator having a main field winding with means for exciting the same, and at least a series-differential winding, a reactor and a drum controller in the arc circuit, said reactor having a winding connected to an element of the controller and also having another winding connected to another element of the controller, the two windings being connected into the arc circuit through the drum of the controller, said last-mentioned reactor winding having at least a part thereof in parallel to said series-differential field.

13. An arc welding system including, a direct current generator having a main field winding with means for exciting the same, and at least a series-differential winding, a reactor and a drum controller in the arc circuit, said reactor having a winding connected directly to an element of the controller and also having another winding connected to another element of the controller, a resistor between said last-mentioned winding and the controller element, said drum acting to close the arc circuit through said two reactor windings, said last-mentioned reactor winding having at least a part thereof in parallel to said series-differential field.

14. An arc welding system including, a direct current generator having a main field winding and at least a differential-series winding, means for quickly controlling the action of said differential-series winding comprising a reactor having a winding in parallel with said differential-series winding, and another winding in inductive relation to the first winding and connected directly into the arc circuit.

15. An electric arc welding current generator having a series field winding and an additional field winding, a variable inductive resistance shunt around at least a portion of said series field winding, the inductive reactance of such shunt being equal to at least a substantial part of the inductance of the shunted series field winding, and means for varying the resistance of such shunt without materially varying its inductive reactance.

16. An electric arc welding system including a welding current generator and an arc circuit, which circuit includes a series field winding of the generator and an inductive resistance shunt around said series field winding, and means for simultaneously varying the impedance of the arcing current circuit through said series field winding and the impedance of said shunt.

CLAUDE J. HOLSLAG.